(12) United States Patent
Fischer et al.

(10) Patent No.: US 7,146,853 B2
(45) Date of Patent: Dec. 12, 2006

(54) DEVICE AND METHOD FOR DETERMINING THE SIDE POSITION OF WHEELS AND MOTOR VEHICLE HAVING THE DEVICE

(75) Inventors: Martin Fischer, Bad Soden (DE); Gregor Kuchler, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 40 days.

(21) Appl. No.: 11/030,767

(22) Filed: Jan. 7, 2005

(65) Prior Publication Data

US 2005/0145025 A1 Jul. 7, 2005

(30) Foreign Application Priority Data

Jan. 7, 2004 (DE) .................... 10 2004 001 250

(51) Int. Cl.
*E01C 23/00* (2006.01)
(52) U.S. Cl. ........................................ 73/146
(58) Field of Classification Search ............... 73/146, 73/146.2, 488, 146.4, 146.5; 152/415
See application file for complete search history.

(56) References Cited

U.S. PATENT DOCUMENTS 5,749,984 A * 5/1998 Frey et al. ............... 152/415
5,880,363 A 3/1999 Meyer et al.
6,112,585 A 9/2000 Schrottle et al.
6,446,502 B1 9/2002 Normann et al.
6,516,657 B1 * 2/2003 Shirato et al. ............. 73/118.1
6,633,229 B1 10/2003 Normann et al.
2003/0076222 A1 4/2003 Fischer et al.

FOREIGN PATENT DOCUMENTS

| DE | 197 20 123 C2 | 7/1998 |
| DE | 101 44 360 A1 | 4/2003 |
| EP | 0 763 437 B1 | 3/1997 |
| EP | 0 806 307 B1 | 11/1997 |
| EP | 1 003 647 B1 | 5/2000 |

\* cited by examiner

Primary Examiner—Jewel Thompson
(74) Attorney, Agent, or Firm—Laurence A. Greenberg; Werner H. Stemer; Ralph E. Locher

(57) ABSTRACT

A device and a method for determining a side position of wheels during cornering of a motor vehicle include a plurality of sensor devices each being installed at a tire of a wheel for detecting mechanical deformation of the tire when it rolls forward on a road surface. Electronic wheel units are each connected by signal to an assigned sensor device. A central evaluation device is connected to the electronic wheel units for receiving detected deformation data and determining the side positions of the individual wheels during the cornering of the vehicle, from contact area lengths determined from deformation data.

17 Claims, 2 Drawing Sheets

DEVICE AND METHOD FOR DETERMINING THE SIDE POSITION OF WHEELS AND MOTOR VEHICLE HAVING THE DEVICE

BACKGROUND OF THE INVENTION

Field of the Invention

The invention relates to a device and a method for determining the side position of the wheels of a motor vehicle. The invention also relates to a motor vehicle having the device.

For safety reasons, the tire pressure of motor vehicles must be checked regularly, a check that is however very often neglected. For that reason, modern motor vehicles include tire pressure checking facilities which automatically measure the tire pressure and at least detect a critical deviation from a desired value of the internal pressure of the tire and then display that information to the driver of the motor vehicle. This renders manual checking unnecessary.

For those purposes, each wheel typically has an electronic wheel unit which records the tire pressure of a specifically allocated wheel and sends that information to an evaluation device of the motor vehicle. An electronic wheel unit can be any device that determines information through the use of which error conditions possibly occurring on the wheel can be detected. The term "error condition" must be interpreted broadly in this context and includes all conditions, properties and information about a specific wheel that are regarded as being worthy of being detected.

In addition to the actual detection of an error condition, methods and devices of that kind provide that the wheel position of each individual wheel is also determined and conveyed with a specific error condition. A plurality of different methods for determining the wheel positions, some of which are briefly described below, which in the relevant literature is often also referred to as localization, are known.

European Patent EP 806 307 B1 describes an air pressure control device which sends a signal with an individual detection to a central evaluation device for each wheel position. As a result, the central unit allocates the detection of the wheel position for the corresponding wheel according to stored detections. However, that method is exceptionally hardware and software-intensive and, particularly in the evaluation unit, requires higher costs for decoding the respective individual detections. In addition, that device also places a load on the batteries of the electronic wheel units fitted to each wheel because of higher coding costs for sending the individual detection.

German Patent DE 197 20 123 C2 describes a tire pressure control device in which, in the area of each wheel to be monitored, a specially allocated receiver antenna is provided through the use of which the signals that have been sent from the electronic wheel unit can be received. In fact, that receiver antenna also receives signals from the electronic wheel units of the neighboring wheels. In order to distinguish the wheel position of each individual wheel, it is assumed that a signal sent from and received by a directly adjacent wheel unit has a higher signal level than a signal which is received from an electronic device that is further away. That known system is also exceptionally hardware and software-intensive because a special antenna must particularly be provided for each electronic device.

In the case of an additional known method of that kind for determining the wheel position, each electronic wheel unit sends the corresponding information through the use of high-frequency signals to the central evaluation device. That signal can be allocated to a wheel position through evaluating the field strength of the received signals.

The problem with that field strength-dependent determination of the wheel position lies in the fact that the received field strength (RSSI=Received Signal Strength Indicator) depends on a wide diversity of parameters, for example, the sensitivity of the receiver, the power output of the electronic device, the type of rim, the torque of the wheel, reflections of the sinusoidal high-frequency signal, environmental parameters, etc.

In addition to the above-mentioned parameters, the received field strength to a large extent depends on the specific wheel angle of the electronic wheel unit during the transmission. The cause therefor is that the electronic wheel unit or its transmitter antenna forms part of the wheel and therefore rotates with the corresponding wheel, in which case the transmitted data signals depend on rotation effects. In particular, the angle of the wheel results in considerable field strength fluctuations.

Moreover, the left/right localization has so far been achieved through the use of acceleration sensors: European Patent EP 1 003 647 B1, corresponding to U.S. Pat. Nos. 6,446,502 and 6,633,229, discloses a device in which the indicator of the acceleration measured in the wheel indicates the side of the vehicle. A disadvantage of that method is the necessity for a separate acceleration sensor.

An additional procedure analyzes the field strength of the radiogram which is received by the vehicle. European Patent EP 0 763 437 B1, corresponding to U.S. Pat. No. 6,112,585, discloses a system in which the field strength of a radiogram is analyzed through the use of four antennas fitted in the vicinity of the wheel in each case. The location of installation of the antenna with the highest measured field strength then detects the wheel from which the telegram originates. A disadvantage of that method lies in the fact that the antenna installation involves a great deal of effort.

In addition, so-called trigger antennas can be used. U.S. Pat. No. 5,880,363 describes a system in which, through the use of a long-wave signal, exactly one wheel electronics device for the emission of a data telegram is excited in that way with a special detection signal. As a result, the identification codes of the allocated wheel electronics devices are detected by cyclically exciting all the wheel positions. A disadvantage of that method is the necessity for additional long-wave antennas on the side of the vehicle and additional long-wave receiver units on the side of the wheel.

U.S. Pat. No. 5,749,984 shows a device for monitoring the tire status of a motor vehicle with several sensor devices which in each case are fitted to an allocated tire of a wheel for detecting a mechanical deformation of the corresponding tire when that tire rolls forward on the road surface. Electronic wheel units are in each case connected by signal to an allocated sensor device. A central evaluation device is connected by signal to the electronic wheel units for receiving the detected deformation data and determines the contact area lengths from the deformation data.

Finally, German Published, Non-Prosecuted Patent Application DE 101 44 360 A1, corresponding to U.S. Patent Application Publication No. US2003/076222, shows a device and a method through the use of which, on the basis of the rotational speed variables of the wheel determined during cornering, the side positions of the respective wheels are determined.

SUMMARY OF THE INVENTION

It is accordingly an object of the invention to provide a device and a method for determining the side position of wheels and a motor vehicle having the device, which overcome the hereinafore-mentioned disadvantages of the heretofore-known devices and methods of this general type and in which the specific side position of the wheel can be specified in a simple, but very accurate manner.

With the foregoing and other objects in view there is provided, in accordance with the invention, a device for determining a side position of wheels of a motor vehicle during cornering. The device comprises a plurality of sensor devices each mounted to a corresponding tire of a respective individual wheel for detecting a mechanical deformation of the corresponding tire upon the corresponding tire rolling forward on a road surface and supplying deformation data. Electronic wheel units are each connected by signal to a respective one of the sensor devices. A central evaluation device is connected by signal to the electronic wheel units for receiving signals, i.e. the detected deformation data sent from the electronic wheel unit, and for determining side positions of the individual wheels during cornering of the vehicle from contact area lengths determined from the deformation data.

With the objects of the invention in view, there is also provided a method for determining a side position of wheels of a vehicle during cornering. The method comprises detecting mechanical deformations of respective tires of individual wheels, upon the tires rolling forward on a road surface, with sensor devices each connected to a respective electronic wheel unit and supplying deformation data. The detected deformation data are sent from the respective electronic wheel units to a central evaluation unit. The side positions of the individual wheels are determined during cornering from contact area lengths determined from the received deformation data by the central evaluation unit.

With the objects of the invention in view, there is additionally provided a motor vehicle, comprising the device described above for carrying out the method described above.

The advantage of the present invention, compared to the prior art, is thus that the cost of the technical equipment for side localization can be reduced. No costly antenna instruments and no long-wave units for addressing the wheel electronics device are required. The sensor device for detecting a mechanical deformation of the tire is clearly easier to use than an acceleration sensor. It is only by determining the respective contact area lengths of the wheels by evaluating the detected deformation data, that accurate information can be given, during cornering, about the side of the motor vehicle on which the specific wheel is located, because the outer wheels are placed under a higher load during cornering than the inner wheels and, therefore, have a longer contact area than the inner wheels. As a result, on one hand the wheel electronics device, which indicates comparatively short contact area lengths, can be allocated to the side of the motor vehicle which points towards the inside of the curve. On the other hand, the wheel electronics device which indicates comparatively long contact area lengths can be allocated to the side of the motor vehicle which points towards the outside of the curve.

In accordance with another feature of the invention, the sensor devices are fitted, in each case, to the side wall of the specific tire. In this way, direct impact on the sensor devices is prevented for the most part. As a result, the sensor devices are fitted particularly advantageously in each case to the side wall of the specific tire which is turned away from the motor vehicle. In this way, the contact area lengths are not anywhere near rectangular when placed under load in a curve, but take on a shape in which the inner curve limit of the contact area is shorter than the outer curve limit. Therefore, by fitting the sensor device to the side wall of the corresponding tire which is turned away from the motor vehicle, this dynamic change in shape of the contact area can then be utilized advantageously to determine an even shorter contact area on the inside of the curve and an even longer contact area on the outside of the curve.

In accordance with a further feature of the invention, the sensor devices are embodied in each case as resistive expansion strips, a piezoelectric fiber material, a piezoelectric crystal, a piezoelectric resistor, a surface wave filter (SAW) or a combination of the above-mentioned possibilities. Advantageously, the sensor devices are connected in each case through a wireless connection, for example, a radio or an infrared connection or an electrical connection to the associated electronic wheel unit. A wireless connection such as for example a radio or infrared connection can also exist between the electronic wheel unit and the central evaluation unit so that data can be transmitted wirelessly between them.

In accordance with an added feature of the invention, the electronic wheel unit is connected to a tire status control system. The electronic wheel unit receives both the data of the tire status control system and the data of the sensor device and sends it to the central evaluation unit.

In accordance with an additional feature of the invention, the sensor devices used in each case have a dual function. On one hand, a mechanical deformation of the tire while cornering is detected and, on the other hand, in the case of such a deformation, the respective sensor devices convert the mechanical deformation energy into electrical energy which generates an autonomous system. Preferably, in addition to the sensor devices, further components such as, for example, the electronic wheel unit, can be operated with this converted electrical energy.

In accordance with yet another feature of the invention, impulses are measured through the use of the sensor devices which, when placing and removing the respective tire treads onto or from the road surface of the vehicle, conform to the change in the deformation of the individual tire. The time spans between such consecutive impulses are particularly determined through the use of the specific electronic wheel unit and transmitted to the central evaluation device. For example, several consecutively measured time spans of an allocated wheel can be averaged, i.e. through several consecutive measurements, in which case the contact area length of the corresponding wheel is determined from the average time span and the vehicle speed that is determined. Preferably, the determined contact area lengths of the individual wheels are compared with one another and the specific wheel side of the corresponding wheel is determined on the basis of this comparison. However, it is also conceivable for a measured contact area length to be compared, for example, with stored reference values and hence for the associated wheel side to be determined therefrom. In order to be able to detect the direction of the cornering action, the yawing angle and/or the maximum angle of turn or steer angle are preferably also measured and also taken into account during the evaluation.

In accordance with a concomitant feature of the invention, the variables of the tire status are sent by the corresponding electronic wheel unit together with an identification code to the central evaluation unit, for the unambiguous detection of the corresponding electronic wheel unit. As a result, through the use of the evaluation unit it is possible to exactly determine from which previously well-known electronic wheel unit the sent data originates to allow optimum synchronization to this wheel unit.

Other features which are considered as characteristic for the invention are set forth in the appended claims.

Although the invention is illustrated and described herein as embodied in a device and a method for determining the side position of wheels and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
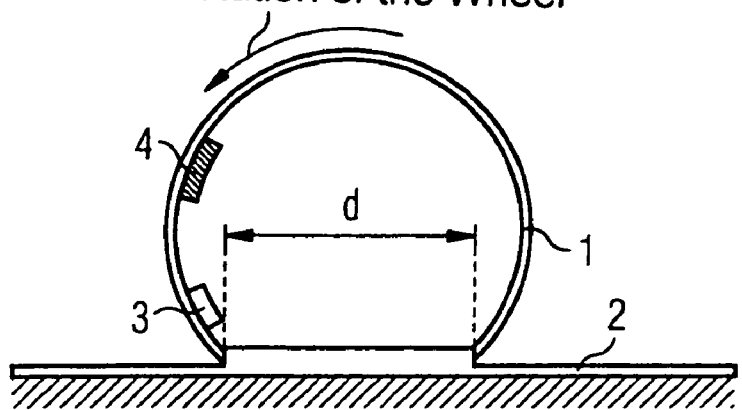
FIG. 1 is a diagrammatic, side-elevational view of a tire rolling forward on a road surface.

Referring now in detail to the figures of the drawings, in which the same reference symbols are allocated to the same elements or elements with the same functions, unless stated otherwise, and first, particularly, to FIG. 1 thereof, there is seen a diagrammatic side view of a tire 1 which is rolling forwards on a road surface 2. In FIG. 1, the curved arrow shows the counterclockwise direction of rotation of the wheel so that the vehicle would move towards the left side as the wheels turn.

As can be seen in FIG. 1, a sensor device 3 which is fitted to the tire 1 detects a mechanical deformation of the tire 1 as the relevant tire tread or contact area d makes contact with or loses contact with the road surface 2. The sensor device 3 is preferably embodied as a piezoelectric fiber material which converts a mechanical deformation into electrical impulses through the use of the piezoeffect. The sensor device 3 can also, for example, be embodied as expansion measurement strips, a piezoelectric fiber material, a piezoelectric crystal, a piezoelectric resistor, a surface acoustic wave (SAW) filter or as a combination of the above-mentioned possibilities.

The sensor device 3 is preferably fitted to the inside wall of the tire 1 facing out from the vehicle because the contact areas, i.e. the contact areas of the tires on the road surface 2, take on a shape under load in a curve in the case of which the inner border of the curve of the contact area is shorter than the outer border of the curve of the contact area. In other words, the tire 1 on the inside of the curve of the tire has a smaller tire running curve than on the outside of the curve of the tire. This dynamic change in shape of the contact area can be utilized advantageously in such a way that the sensor device 3, as has already been explained above, is fitted to the side wall of the tire 1 facing away from the vehicle in order to establish an even shorter contact area on the inside of the curve and an even longer contact area on the outside of the curve, in addition to the difference in the contact area between a tire fitted to the inside of the curve and a tire fitted to the outside of the curve as explained further below.

As can also be seen in FIG. 1, an electronic wheel unit or wheel electronics device 4 is preferably fitted on a wheel allocated to the tire 1 and is connected, for example, through the use of the sensor device or impulse sensor 3 to an electrical connection or a wireless connection such as, for example, a radio connection, in order to receive measured signals or impulses. The electronic wheel unit 4 is fitted, for example, to a valve of the wheel and/or fitted to the bottom of the allocated wheel rim. In principle, the wheel electronics device or the wheel unit 4 can be fitted anywhere on the wheel (tire or rim). Practically speaking, a direct, conductive connection between the impulse sensor 3 and the wheel electronics device 4 is recommended. As a result, the sensor 3 fitted to the side wall of the tire in practice also determines the place where the wheel electronics device should be fitted. In principle, it can also be fitted on the rim, more practically at least to the tire, but more usefully to the side wall too, adjacent the sensor, preferably in the unit with the sensor. The electronic wheel unit 4 is preferably connected to a tire pressure control system, for example, a conventional Siemens VDO Tireguard System, which detects, through the use of sensors, the variables of the wheel and/or the tire status and, for example, sends this information to a central evaluation unit through the use of a wireless radio transmission route through a receiver fitted to the vehicle side and a transmitter fitted to the wheel side or the tire side.

Figure 2A:
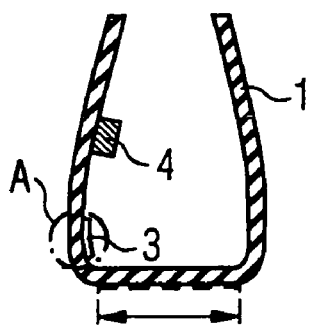
FIG. 2A is a fragmentary, rear-sectional view of a tire according to an embodiment of the invention, on the inside of a curve.
Figure 2B:
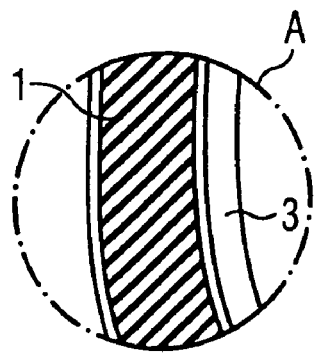
FIG. 2B is an enlarged view of a portion A of FIG. 2A.

FIGS. 2A and 2B respectively show a fragmentary, diagrammatic, rear-sectional view of a tire 1 on the inside of the curve fitted to the left side, and an enlarged view of a portion detail A.

Figure 3A:
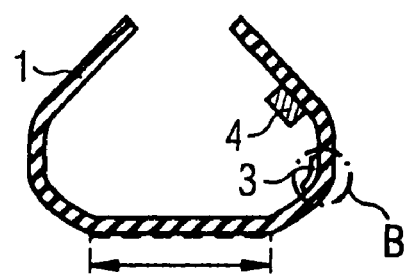
FIG. 3A is a fragmentary, rear-sectional view of a tire according to an embodiment of the invention, on the outside of the curve.
Figure 3B:
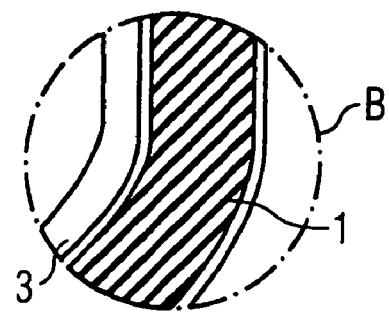
FIG. 3B is an enlarged view of a portion B of FIG. 3A.

FIGS. 3A and 3B respectively show a fragmentary, diagrammatic, rear-sectional view of a tire 1 on the outside of the curve fitted to the right side, and an enlarged view of a portion B.

According to this exemplary embodiment, the non-illustrated motor vehicle with the tire 1 fitted to the left side according to FIG. 2A and with the tire 1 fitted to the right side according to FIG. 3A is in a left corner turn in which case, based on the higher load during cornering, the wheel on the outside of the curve according to FIG. 3A is placed under a higher load and, therefore, has a longer contact area (see FIG. 1) than the wheel on the inside of the curve according to FIG. 2A. Moreover, as can be seen in FIGS. 2A and 3A, the tire 1 on the outside of the curve according to FIG. 3A has a stronger and tangentially earlier setting in deformation because of the higher curve load of the outer wheel. In the same way, according to FIG. 3A, the deformation of the sensor device 3 in the case of the tire 1 on the outside of the curve takes longer than the tire 1 on the inside of the curve according to FIG. 2A.

Therefore, the period between the setting in of the deformation when the tire portion is put down onto the road surface 2 and the end of the deformation when the corresponding tire portion comes away from the road surface 2 is a measurement for the contact area length d and, therefore, for the extent of the load of the corresponding tire 1. As has already been explained above, because the load of the tire 1 on the outside of the curve is higher than the load of the tire 1 on the inside of the curve, the side position of the wheel can be determined by evaluating the measured information signals which is explained in greater detail below.

Figure 4:
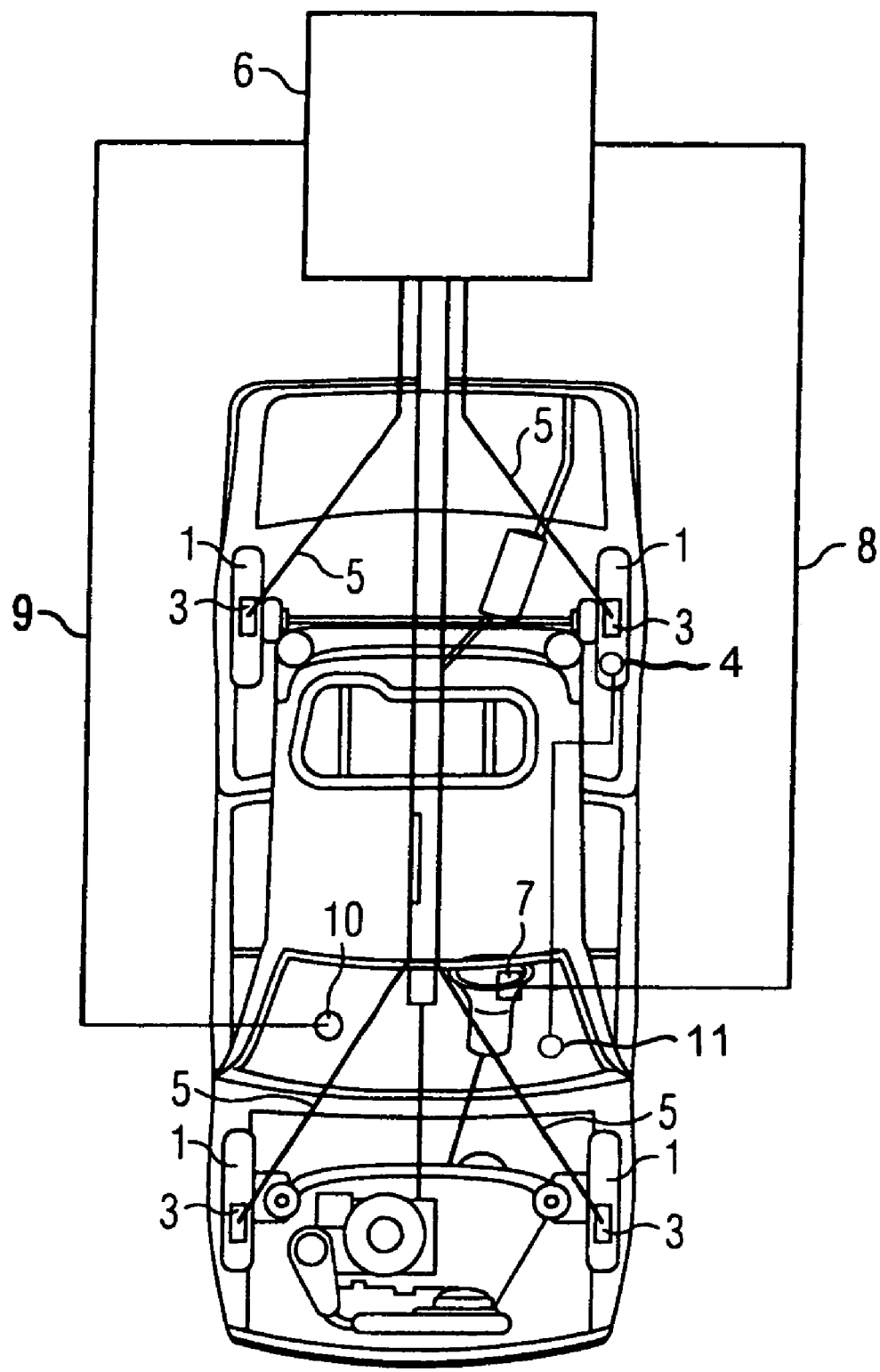
FIG. 4 is a schematic and block diagram of a device according to an embodiment of the invention, with a motor vehicle shown in a top-plan view.

FIG. 4 is a schematic and block diagram of a device according to an embodiment of the invention on a diagrammatically illustrated motor vehicle. Each tire 1 has an allocated sensor device 3, which is connected, for example through an electrical connection or a wireless connection, to an electronic wheel unit 4, only one of which is shown.

The evaluation of the measured deformation signals is explained below by using one tire as an example, with the method being equally applicable for the other tires.

As has already been explained above, the sensor device 3 of the exemplary tire 1 measures impulses which conform to the change in the deformation of the side wall of the tire as the tire tread makes contact with and comes away from the road surface. The deformation impulses recorded by the sensor device 3 are transmitted to the interconnected electronic wheel unit 4. The electronic wheel unit 4 determines the time spans between consecutive impulses and transmits the determined time spans through, for example, a wireless radio connection 5 to a central evaluation unit 6. As an alternative or in addition, the determined impulses can also be transmitted directly from the electronic wheel unit 4 to the central evaluation unit 6, in which case the central evaluation unit 6 determines the time spans between the consecutive impulses in that case.

Preferably, several such consecutive measurements are compared with each other so that the measured time spans are averaged and the calculated average is used again. Subsequently, the associated contact area length d of the associated tire is determined, by also using the speed of the vehicle sent to the central evaluation unit 6 and the averaged time spans between consecutive impulses.

The corresponding electronic wheel unit 4 also preferably sends the variables of the tire status together with an identification code to the central evaluation unit 6 through the radio connection 5 for the unambiguous detection of the corresponding electronic wheel unit. As a result, the purpose of the identification code is two-fold:

1. In the case of a single localization, the identification codes of each wheel electronics device can be used to allocate the wheel position previously determined by simply comparing it with a stored allocation criterion. As a result, it is only necessary to carry out the localization again if the possibility of a change in the tire has arisen, for example if the vehicle was parked for a few minutes.

2. Some localization methods (for example, through radio field strengths) run continuously and make the ID code for localization purposes superfluous. Nevertheless, the ID code is still required to differentiate vehicle-specific transmitters from random adjacent transmitters outside the vehicle. For example, during slow-moving traffic, a radio receiver not only hears the four wheel electronics devices of the specific vehicle, but many other wheel electronics devices of neighboring vehicles. As a result, from the plurality of transmissions, only those are filtered out having an ID code which conforms to the criterion that was stored beforehand.

The electronic wheel units 4 or the measured tire 1 to the right or the left side, as seen in the direction of travel of a motor vehicle, for example, are allocated during cornering at a predetermined speed by determining the angle of the curve from an existing yawing angle signal and/or from the maximum angle of turn or steer angle of the driver, which is information available on the vehicle bus. Therefore, the data of the curve angle is determined, for example, through the use of an additional yawing angle sensor device or maximum angle of turn sensor device already existing in the system and sent through an allocated connection 8 to the central evaluation unit 6. In this way, by relatively comparing the individual contact area lengths d of the individually measured tires 1 of a motor vehicle it is possible to unambiguously determine whether or not the contact area length d is allocated to a tire on the outside of the curve or a tire on the inside of the curve of a motor vehicle during cornering. As a result, on one hand electronic wheel units 4 which report comparatively short contact area lengths because of lower curve loads are allocated to the vehicle side which points towards the inside of the curve. On the other hand, electronic wheel units 4 which indicate comparatively long contact area lengths because of the higher curve load are allocated to the vehicle side which points towards the outside of the curve.

The sensor device 3, for example an element based on piezofibers, will preferably also be used to detect deformation impulses used as an electrical supply source. In this case, the mechanical energy generated because of the deformation of the tire 1 is converted by the sensor device 3 into electrical energy in which case, for example, the energy needed to operate or support the sensor device 3 as well as the energy needed to supply the electronic wheel unit 4 can be generated and made available. As a result, the additional utilization of the sensor device for simultaneous electric energy supply reduces the technical costs in comparison with well-known devices. It would be desirable to completely replace the battery with the sensor element. However, use as an auxiliary energy source in addition to the battery that is still available can also be envisioned (and is easier to implement). An advantage of this development is either an extension of the vehicle battery service life in the case of the same battery or use of a smaller battery (regarding capacity and installation area) for which the service life remains the same.

Finally, should a critical tire status be detected, the central evaluation unit 6 can send, through the use of a connection 9, a signal to a display unit 10 through the use of which the operator of the motor vehicle is informed about which tire, in each case, has a critical status. The electronic wheel units 4 can also each be directly connected to a respective tire status control system (or one common system) 11, only one of which is shown in FIG. 4.

Although this invention was described above on the basis of a preferred embodiment, it is not restricted thereto, but can be modified in numerous ways.

This application claims the priority, under 35 U.S.C. § 119, of German Patent Application 10 2004 001 250.4, filed Jan. 7, 2004; the entire disclosure of the prior application is herewith incorporated by reference.

We claim:

1. A device for determining a side position of wheels of a motor vehicle during cornering, comprising:

a plurality of sensor devices each mounted to a corresponding tire of a respective individual wheel for detecting a mechanical deformation of the corresponding tire upon the corresponding tire rolling forward on a road surface, said sensor devices supplying deformation data and converting deformation energy into electrical energy;

electronic wheel units each connected by signal to a respective one of said sensor devices and at least partially operating on the electrical energy generated by said sensor devices; and a central evaluation device connected by signal to said electronic wheel units for receiving the detected deformation data and for determining side positions of the individual wheels during cornering of the vehicle from contact area lengths determined from the deformation data.

2. The device according to claim 1, wherein said sensor devices are each installed at an inside wall of the respective corresponding tire.

3. The device according to claim 1, wherein said sensor devices are each installed at an inside wall facing away from the vehicle of the respective corresponding tire.

4. The device according to claim 1, wherein said sensor devices are selected from the group consisting of expansion measurement strips, a piezoelectric fiber material, a piezoelectric crystal, a piezoelectric resistor, a surface acoustic wave filter and a combination thereof.

5. The device according to claim 1, which further comprises a respective electrical connection or wireless connection connecting each of said sensor devices to a respective one of said electronic wheel units.

6. The device according to claim 1, which further comprises a respective wireless connection connecting each of said electronic wheel units to said central evaluation unit.

7. The device according to claim 1, which further comprises a tire status control system connected to each of said electronic wheel units.

8. A motor vehicle, comprising the device according to claim 1.

9. A method for determining a side position of wheels of a vehicle during cornering, which comprises the following steps:

detecting mechanical deformations of respective tires of individual wheels, upon the tires rolling forward on a road surface, with sensor devices each connected to a respective electronic wheel unit and supplying deformation data;

measuring impulses corresponding to a change in deformation of the individual tire or tire sidewalls, upon the respective tire treads coming into contact with or losing contact with the road surface:

determining time spans between consecutive impulses with the respective electronic wheel units;

sending the detected deformation data including the time spans from the respective electronic wheel units to a central evaluation unit; and determining the side positions of the individual wheels during cornering from contact area lengths determined from the received deformation data by the central evaluation unit.

10. The method according to claim 9, which further comprises averaging measured time spans of a wheel through several consecutive measurements.

11. The method according to claim 10, which further comprises determining the contact area length of a corresponding wheel from the averaged time spans and a speed of the vehicle.

12. The method according to claim 11, which further comprises comparing the contact area lengths of the individual wheels with one another to determine respective wheel side positions.

13. The method according to claim 9, which further comprises measuring a yawing angle and/or a steer angle and taking the yawing angle and/or steer angle into account with the central evaluation unit.

14. The method according to claim 9, which further comprises converting mechanical energy generated by deformation of a tire, with a respective sensor device, into electrical energy for operating or supporting operation of that respective sensor device and/or an electronic wheel unit.

15. The method according to claim 9, which further comprises sending variables of a tire status from a respective electronic wheel unit, together with an identification code, to the central evaluation unit, for an unambiguous detection of the respective electronic wheel unit.

16. A motor vehicle, comprising a device for carrying out the method according to claim 9.

17. A method for determining a side position of wheels of a vehicle during cornering, which comprises the following steps:

detecting mechanical deformations of respective tires of individual wheels, upon the tires rolling forward on a road surface, with sensor devices each connected to a respective electronic wheel unit and supplying deformation data:

sending the detected deformation data from the respective electronic wheel units to a central evaluation unit: and assigning comparatively short contact area lengths to a side of the motor vehicle facing towards an inside of a curve and assigning comparatively long contact area lengths to a side of the motor vehicle facing towards an outside of the curve and determining the side positions of the individual wheels during cornering from the contact area lengths determined from the received deformation data by the central evaluation unit.

* * * * *